US010721527B2

(12) United States Patent
Navin et al.

(10) Patent No.: US 10,721,527 B2
(45) Date of Patent: Jul. 21, 2020

(54) DEVICE SETTING ADJUSTMENT BASED ON CONTENT RECOGNITION

(71) Applicant: Free Stream Media Corporation, San Francisco, CA (US)

(72) Inventors: Ashwin Navin, San Francisco, CA (US); David Harrison, Daly City, CA (US)

(73) Assignee: Free Stream Media Corporation, San Francisco, CA (US)

( * ) Notice: Subject to any disclaimer, the term of this patent is extended or adjusted under 35 U.S.C. 154(b) by 0 days.

(21) Appl. No.: 15/959,975

(22) Filed: Apr. 23, 2018

(65) Prior Publication Data

US 2019/0327526 A1  Oct. 24, 2019

(51) Int. Cl.
H04N 7/173 (2011.01)
H04N 21/45 (2011.01)
H04N 21/472 (2011.01)
H04N 21/433 (2011.01)

(52) U.S. Cl.
CPC ....... *H04N 21/4532* (2013.01); *H04N 21/433* (2013.01); *H04N 21/47217* (2013.01)

(58) Field of Classification Search
USPC ............................. 725/115, 13, 18, 34, 46, 59
See application file for complete search history.

(56) References Cited

U.S. PATENT DOCUMENTS

| 8,429,103 | B1 | 4/2013 | Aradhye et al. |
| 2009/0087016 | A1 | 4/2009 | Berestov et al. |
| 2014/0143384 | A1* | 5/2014 | Wong ............... H04L 67/34 709/219 |
| 2015/0073574 | A1 | 3/2015 | Brenner et al. |
| 2015/0074047 | A1 | 3/2015 | Gardes et al. |
| 2015/0121408 | A1* | 4/2015 | Jacoby ............ H04N 21/6582 725/18 |
| 2016/0044151 | A1 | 2/2016 | Shoemaker et al. |
| 2017/0006351 | A1* | 1/2017 | Haberman ........ H04N 21/482 |
| 2017/0358275 | A1 | 12/2017 | Klement et al. |
| 2017/0358276 | A1* | 12/2017 | Mese ................ G09G 5/10 |
| 2018/0288813 | A1* | 10/2018 | Asnis ............... H04L 65/4092 |

OTHER PUBLICATIONS

International Search Report and Written Opinion for corresponding International Application No. PCT/US2019/028064 dated Jul. 16, 2019.

* cited by examiner

*Primary Examiner* — Jivka A Rabovianski
(74) *Attorney, Agent, or Firm* — Hogan Lovells US LLP

(57) ABSTRACT

Approaches provide for adjustment of playback settings on a user device based at least in part on a type of content being consumed via the user device. The content type may be determined based on a fingerprint acquired from the content presented via on the client device. The content type may be associated with one or more associated playback settings based on properties of the content type, which may be stored in a content profile. The playback settings may be provided to the user device to set or adjust one or more settings of the user device, as may relate to the presentation of the content.

20 Claims, 9 Drawing Sheets

DEVICE SETTING ADJUSTMENT BASED ON CONTENT RECOGNITION

BACKGROUND

As electronic devices become increasingly sophisticated, people are using such devices to view and consume content at greater rates. Such content may be viewed at different locations (e.g., within a home, in a public place, outdoors, etc.) and therefore settings associated with rendering the content are increasingly important to provide an optimal user experience. Furthermore, different types of content may be preferably viewed with different device settings. For example, a certain ambiance associated with the content may be best reflected by adjusting the settings, such as dark or muted colors associated with scary media content. Unfortunately, device settings are often predetermined by the manufacturer, or set by a user once in a while, but may not be specifically optimized for a particular piece of content. Therefore, users either manually adjust settings to the best of their abilities when needed, often leading to poor viewing quality and an unacceptable user experience. These types of experiences do not allow the device to exhibit the best viewing experience or may deter the user from consuming the associated content.

BRIEF DESCRIPTION OF THE DRAWINGS

Various embodiments in accordance with the present disclosure will be described with reference to the drawings, in which.

DETAILED DESCRIPTION

Figure 1A:
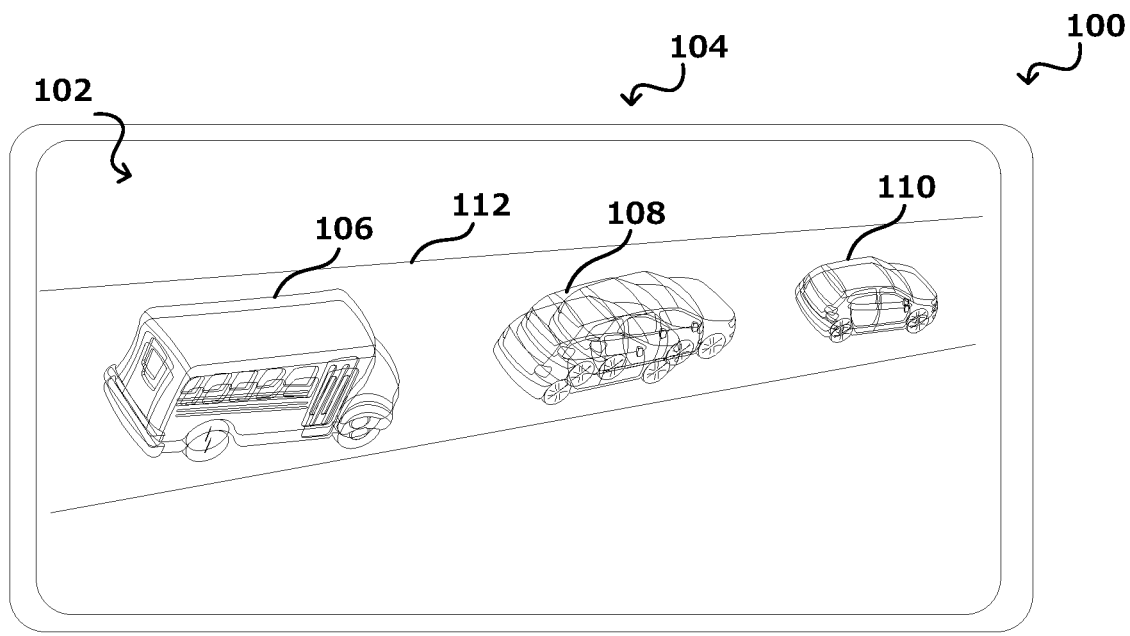
FIG. 1A illustrates an example environment in which aspects of the various embodiments can be utilized.

Systems and methods in accordance with various embodiments of the present disclosure may overcome one or more of the aforementioned and other deficiencies experienced in conventional approaches to controlling playback of media content. In particular, various approaches provide for using a voice communications device to control, refine, or otherwise manage the playback of media content in response to a spoken instruction.

In various embodiments, user devices such as televisions, monitors, wearable devices, smartphones, tablets, handheld gaming devices, and the like may include display elements (e.g., display screens or projectors) for displaying consumer content. This content may be in the form of television shows, movies, live or recorded sporting events, video games, and the like. Typically, the devices are agnostic or unaware of the type of content being rendered, but rather, merely operate to render and display the content as instructed. Often, the devices will have embedded settings associated with how content is rendered. These settings may include settings such as hue, saturation, brightness, contrast, backlight, color, tint, sharpness, refresh rate, aspect ratio, temperature, white balance, gamma, and others. Device manufacturers may attempt to develop profiles or the like associated with certain types of content to provide improved user experiences. For example, a television may have a predetermined "Movie" or "Sports" setting that adjusts one or more settings in an attempt to present an improved viewing experience to users. However, these profiles are implemented manually by a user, which the user may forget to do, or may not be tuned to individual content. For example, movies with dark or muted colors, such as horror or suspenseful movies, may not be optimally viewed with the same settings as a children's movie which may include bright, vibrant colors. As a result, the agnostic nature of the rendering may not provide an ideal user experience.

Furthermore, user devices may also have a number of settings or adjustment for audio playback. These settings may include volume, surround, balance, or the like. Additionally, audio playback may be redirected through auxiliary systems, such as headphones, surround sound speakers, sound bars, and the like. Similarly to video playback, auditory playback may not be ubiquitous across content types. For example, an action movie with loud explosive sequences may not be optimally viewed with settings associated with a dramatic movie. Accordingly, adjustment of the auditory settings based on content type may provide an improved user experience.

In various embodiments, the user devices may operate in tandem with other devices. For example, a television may be connected to a receiver, which may receive inputs from other devices such as set top boxes, gaming systems, multimedia streaming devices, and the like, which the receiver routes to the television for display to the consumer. Furthermore, each of these auxiliary devices may have their own independent settings, which may impact how the user device finally displays the content to the user. For example, a set top streaming box may be designed to operate at a certain frame rate or resolution, while the television may not be designed to operate at that frame rate or resolution. The resulting content display may be choppy or otherwise hard to view, which may discourage the user from viewing certain content. Systems and methods of the present disclosure may be directed toward harmonizing or adjusting the settings for one or more devices to provide improved viewing experiences to users based on recognition of the content being viewed.

In various embodiments, a user device may include a component such as an embedded chipset utilized to identify content being displayed on the user device, which may be referred to as Automatic Content Recognition (ACR). The chipset may be utilized to receive the content feed being transmitted to the user device, for example a live TV feed, a streaming media feed, or feed from a set top cable box. Furthermore, in various embodiments, the chipset may extract or otherwise identify certain frames from the media stream for later processing and recognition. Identification may be facilitated by using a fingerprint made up of a representation of features from the content. For example, software may identify and extract features and compress the characteristic components into a fingerprint thereby enabling unique identification. In various embodiments, a one-way hash may be utilized in the generation of the fingerprint. This fingerprint may then be compared with a database of content to facilitate recognition. This database may include feature vectors and/or machine learning techniques to facilitate robust, quick matching. The recognition of content may be performed by a remote server or by the user device itself if it has sufficient processing capability and access to a content database. It should be appreciated that multiple fingerprints may also be utilized in the identification process. In various embodiments, the fingerprints may be related to individual frames or images and/or auditory segments. The identified content may then be assigned to a category, such as "sports" or "drama" or "television show" or "video game" or the like. The categories may also be further delineated by subsets. For example, within the "sports" category there may be a differentiation between live sports or recorded sports. Further, the sport being played may be identified, such as football, basketball, soccer, and the like. As will be described herein, the identification, which may be performed at least in part by the fingerprint, may be utilized to categorize the content displayed on the user device and thereafter utilized to adjust one or more settings associated with the user device.

While various embodiments include an embedded chipset for generating fingerprints and performing ACR, in other embodiments fingerprint generation and ACR may be performed without an embedded chipset. For example, fingerprint generation and ACR may be performed by a software application running on the user device. As another example, fingerprint generation and ACR may be performed utilizing an application that may include software code stored on a second user device. For example, if a user were watching content on a television the user may incorporate a second user device, such as a smartphone, to take an image or video of the screen or receive a portion of audio from the content. Thereafter, the image, video, or audio content may be utilized similarly as described above to identify the content displayed on the screen. The application may then provide recommended settings to the user, or via one or more communication protocols such as wireless internet or the like, may transmit instructions to the television to adjust one or more settings to enhance playback of the content.

In various embodiments, one or more settings associated with rendering or otherwise presenting content to the users on the user device may be controlled, at least in part, by a remote server or the embedded chipset associated with the ACR. For example, a remote server may be utilized to process and identify content, determine recommended settings for consuming the content, and thereafter transmit instructions to the user device to adjust the one or more settings. The server may also determine a content profile corresponding to the identified content, and transmit the content profile to the user device, which then uses the content profile to adjust settings in accordance with the content profile. The user device may store various content profiles associated with certain settings and select from among them after receiving the identified content profile from the server. In various embodiments, the user may be prompted to approve the adjustments. However, in other embodiments, instructions for manually adjusting the settings may be transmitted to the user. In embodiments where the adjustments are performed automatically or with approval from the user, the adjustments may be performed gradually over a period of time. By adjusting the setting gradually, the changes may not impact the viewing experience for the user. However, in various embodiments, the adjustments may be instantaneous or nearly instantaneous or directly applied. Additionally, it should be appreciated that the content may be continuously monitored and settings may be continuously adjusted based on changes in the content. For example, if the content changes between dark action sequences and bright scenes of dialogue, adjustments may be provided throughout the viewing of the content to maintain recommended settings based on the content currently on the screen. In other words, an updated content profile may be determined and transmitted to the user device and/or accessed on the user device. The updated content profile may then be used to adjust the settings, for example, by updating the settings on the user device to correspond to the settings stored in the content profile. Accordingly, the viewer experience may be enhanced because of the continuous adjustment that provides the content in the appropriate settings based on the particular scene and not just on the classification of the content generally.

Further, in various embodiments, one or more component or auxiliary devices or user-input settings may further be utilized to adjust the one or more settings. For example, the device, which may be a television set, may determine the number of people within the room viewing the television. If there are more people in the room, for example, the audio settings may be adjusted to account for anticipated background noise or sound caused by having more people in the room. For example, watching sporting event with lots of people in the room may cause the system to increase the volume so that each person can hear the program over cheers or noise from the crowd of people in the room. In various embodiments, the set may have access to a device map or list of devices within a household associated with particular users. The set may determine the number of such user devices that are active on the same network and/or in proximity to the set and use this information to estimate the number of individuals present. In various embodiments, the set may have access to broader device map information including user device information for other households and thus may be able to determine that user devices associated with other households are in proximity. In various embodiments, the set may receive information regarding number of people in the room from an on-board camera within the television or from other devices within the room, for example a security camera that is configured to communicate with the set over a network or by determining a number of user devices within the room. As a result, the one or more settings may be adjusted based on the specific viewing conditions of the program, thereby providing an enhanced viewing experience.

In various embodiments, the one or more settings may also be adjusted, at least in part, based on the characteristics of the room containing the television set. For example, one or more sensors within the television may determine information about the configuration of the room. This information may then be utilized to provide information for adjusting the one or more settings. For example, an ambient light sensor within the television may be used to receive information regarding the placement of windows or lighting fixtures within the room. This information may then be used to adjust the brightness or the like of the screen to enhance the viewing experience. Furthermore, in various embodiments, rooms with lots of furniture may be detected, and as a result, the audio settings of the television may be adjusted based on anticipated attenuation of the sound due to the features in the room. Furthermore, in various embodiments, the distance of the users from the television may be detected to further adjust the one or more settings. In various embodiments, sensors embedded within the television or using various other devices in the room, such as user devices, security cameras, proximity sensors, personal home devices, video game consoles, and the like, may be used to obtain information for adjusting the one or more settings. Furthermore, in various embodiments, the user may be prompted to provide information about the room configuration upon installation of the television. In this manner, the user experience can be tailored to the specific configuration of the room for an improved experience.

In various embodiments, viewership history for one or more users may further be used to adjust the one or more settings. For example, the television or other device may detect a user device associated with one or more users, which has a viewership history. The viewership history, thereafter, may be analyzed to determine which types of content the user enjoys. The analysis of content may then be used to adjust the one or more settings. For example, viewership history may indicate that a user likes "loud" or very vivid content. As a result, the one or more settings for other content may be adjusted to be closer (e.g., substantially similar) to the one or more settings for the viewer's preferred types of content.

In various embodiments, one or more profiles or stored viewing settings may be created and/or adjusted. For example, the ACR may further collect information directed toward viewing habits associated with the user. The user may have a favorite type of content or show that the viewer watches consistently, and as a result, settings for that particular content may be saved to quickly enable adjustment with reduced processing. Additionally, settings for types of sports, types of movies, and the like may be stored for quick reference and application. For example, if the user is an avid football fan, settings for football may be applied quickly and anticipatorily (e.g., on Saturday and Sunday) to provide an enhanced viewing experience. Furthermore, in various embodiments, these settings may be saved for later application to other types of content, as described above.

In various embodiments, one or more machine learning or artificial intelligence systems may be incorporated into the systems and methods described herein in order to adjust and refine certain recommended settings. The machine learning systems may be utilized in ACR, for example by incorporating object recognition, facial recognition or video fingerprints or audio fingerprints, or may be utilized in determining and recommending settings for adjustments to user devices. For example, the machine learning systems may evaluate different settings over different content types of associated a range of particular settings or adjustments associated with different content types. Additionally, the machine learning systems may incorporate user feedback to tune or adjust trained models to provide enhanced user experiences.

FIG. 1A illustrates an example user device 100 displaying content 102 using a first set of device settings 104. These devices can include, for example, portable computing device, notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices, other types of display-based devices, smart furniture, smart household devices, smart vehicles, smart transportation devices, and/or smart accessories, among others. The illustrated scene may be a car case in an action movie, by way of example only, and includes vehicles 106, 108, 110 driving along a roadway 112. As shown, each of the vehicles 106, 108, 110 is blurry or otherwise hard to see. This blurred or distorted scene may be a result of the device settings 104 currently incorporated with the device 100. For example, the refresh rate may be set improperly, thereby leading to the distorted scene illustrated in FIG. 1A. As a result, the user may become frustrated and navigate away from the content.

Figure 1B:
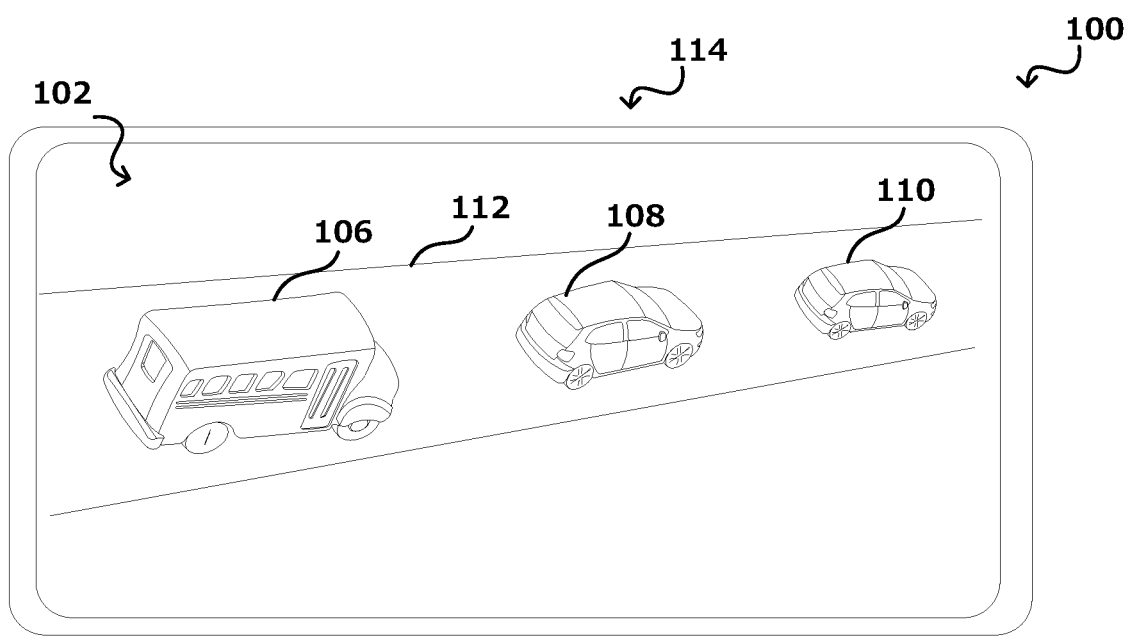
FIG. 1B illustrates an example environment in which aspects of the various embodiments can be utilized.

FIG. 1B illustrates the example user device 100 displaying the content 102 using a second set of display settings 114. The second set of display settings 114 may have been automatically applied to the user device 100 using one or more of the methods described here. As illustrated, the blurry or distorted scene illustrated in FIG. 1A has been corrected and the vehicles 106, 108, 110 are clearly visible to the user. Accordingly, the improved user experience may lead to the user watching more of the content and/or other similar content.

Figure 2:
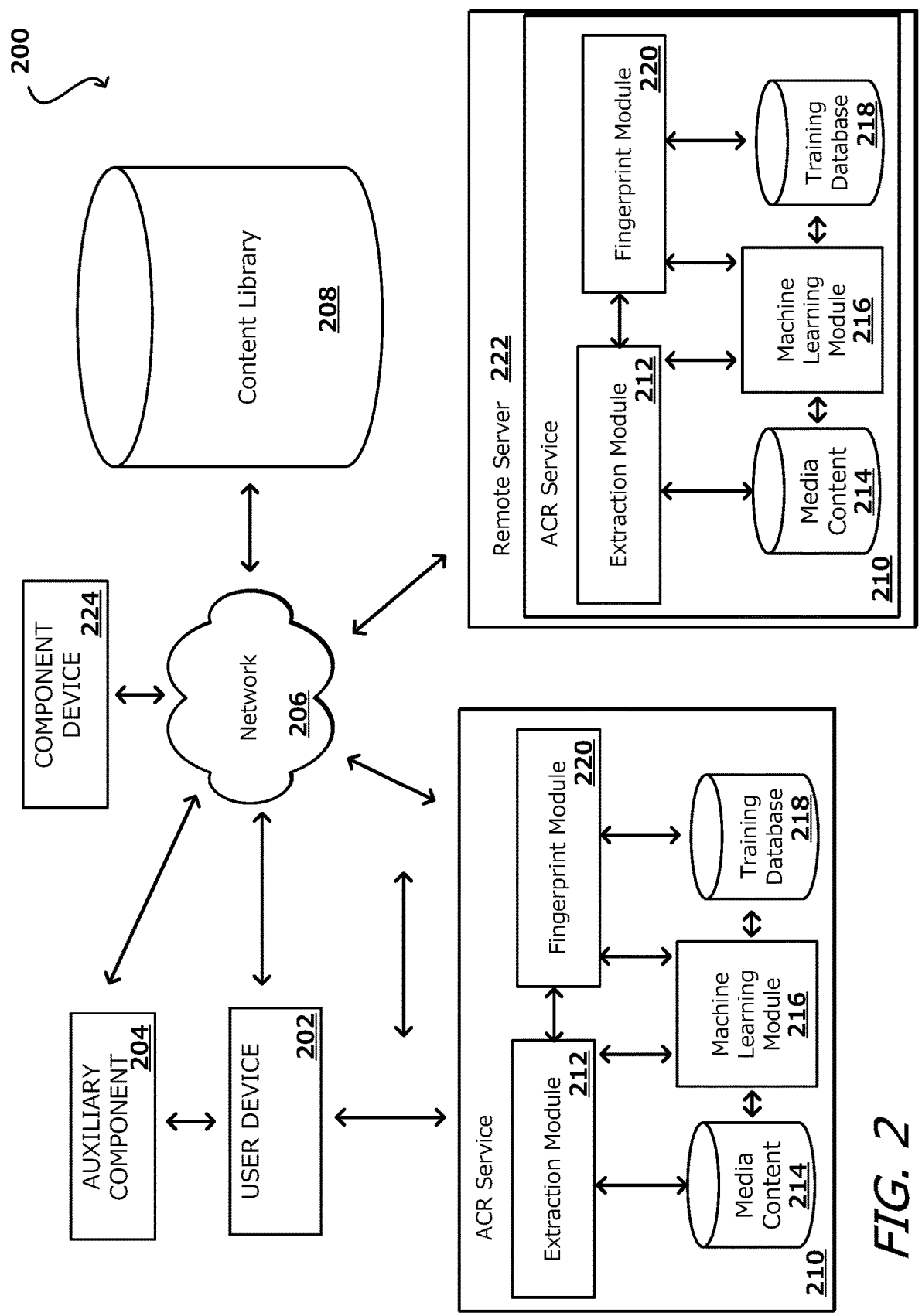
FIG. 2 illustrates an example system for identifying a content type and providing recommended playback settings in accordance with various embodiments.

FIG. 2 illustrates an example system 200 for evaluating and identifying content. In this example, the system 200 shows example data flows between a user device, a network, and associated components. It should be noted that additional services, providers, and/or components can be included in such a system, and although some of the services, providers, components, etc. are illustrated as being separate entities and/or components, the illustrated arrangement is provided as an example arrangement and other arranged as known to one skilled in the art are contemplated by the embodiments described herein. The illustrated system 200 includes the user device 202 and associated auxiliary components 204. As described above, the user device 202 may include a television, personal computing device, laptop, tablet computer, or any other type of device. Furthermore, the auxiliary components 204 may include surround sound speakers, sound bars, set top cable boxes, streaming service boxes, and the like. The illustrated embodiment, the user device 202 and/or the auxiliary components 204 may be in communication with a network 206. The network 206 may be configured to communicate with the user device 202 and/or the auxiliary components 204 via a wired or wireless connection. It should be appreciated that the network 206 may be an Internet or Intranet network that facilities communication with various other components that may be accessible by the network 206. In the illustrated embodiment, the network 206 communicatively couples the user device 202 to a content library 208. The content library 208 may represent one or more streaming services, television services, music services, or the like. Furthermore, while the illustrated embodiment shows the network 206 coupling the content library 208 to the user device 202, it should be appreciated that the content library 208 may be acquired via over-the-air or wired communication protocols, such as an antenna or a coaxial cable arrangement. Furthermore, in various embodiments, the network 206 facilitates communication with various other components that may be accessible by the network 206.

In various embodiments, the user device 202 may be equipped with an ACR service 210, such as via an embedded chipset, an application running on the user device 202, or the like. As described above, the ACR service 210 facilitates identification and fingerprinting of content rendered on the user device 202. For example, the ACR service 210 may include an extraction module 212 which is utilized to grab or otherwise obtain screen shots, video segments, auditory clips, or the like from the content displayed or otherwise utilized by the user device 202. The illustrated extraction module 212 is communicatively coupled to a media content database 214, which may include content available for consumption via the user device 202. The media content database 214 may be utilized in order to compare and identify the media content associated with the extracted information. For example, the media content database 214 may include screen shots or video capture segments from various content that can be evaluated and compared to the extracted information, for instance utilizing one or more machine learning or artificial intelligence techniques. In various embodiments, the media content database 214 may include particular segments from content, such as opening credits which enables robust matching. In other embodiments, the media content database 214 may include images or auditory samples from various actors associated with media content in order to identify or narrow down a range of potential matching content. It should be appreciated that in various embodiments the media content database 214 may not be integrated into the ACR service 210 and may be accessible via a remote server, as will be described below.

The illustrated ACR service 210 further includes a machine learning module 216. In various embodiments, the machine learning module 216 may obtain information from the extraction module 212, the media content database 214, a training database 218, or various other sources. The machine learning module 216 may include various types of models including machine learning models such as a neural network trained on the media content or previously identified fingerprints. Other types of machine learning models may be used, such as decision tree models, associated rule models, neural networks including deep neural networks, inductive learning models, support vector machines, clustering models, regression models, Bayesian networks, genetic models, various other supervise or unsupervised machine learning techniques, among others. The machine learning module 216 may include various other types of models, including various deterministic, nondeterministic, and probabilistic models. In various embodiments, the machine learning module 216 is utilized to quickly categorize and identify content associated with the extracted information. The neural network may be a regression model or a classification model. In the case of a regression model, the output of the neural network is a value on a continuous range of values representing potential content associated with the extracted information. In the case of a classification model, the output of the neural network is a classification into one or more discrete classes. For example, the output representing the extracted information may be classified as "sports", "movie", or "video game" with respect to the content associated with the extracted information. In various embodiments, as weight or confidence factor may be associated with the prediction or identification from the machine learning module 216. For example, a prediction with high confidence may receive a larger associated weight value than a prediction with low confidence.

In various embodiments, the ACR service 210 further includes a fingerprint module 220. The fingerprint module 220 may acquire information, for example from the machine learning module 216 or the extraction module 212 in order to identify the content associated with the user device 220. In the illustrated embodiment, the fingerprint module 220 transmits information to the training database 218. In various embodiments, the successfully identified fingerprints from the fingerprint module 220 may be utilized as ground truth information when training the model associated with the machine learning module 216. Accordingly, the associated ACR service 210 may be utilized to identify content rendered on the user device 202.

In the illustrated embodiment, a remote server 222 also incorporates the previously described ACR service 210. For example, in various embodiments the ACR service 210 may not be embedded within the user device 202, and rather, may be accessible via the network 206. Further, as described above, various components may not be incorporated as illustrated in FIG. 2 in all embodiments. For example, the ACR service 210 embedded within the user device 202 may include the extraction module 212, but may transmit the information, via the network 206, to the remote server 222 for further processing.

In various embodiments, component or auxiliary devices 224, which are illustrated as being communicatively coupled to the network 206, may provide information to the ACR Service 210 and or Remote Server 222 for adjusting the one or more settings. In various embodiments, the component device 224 may be embedded within the user device 202 and/or the auxiliary component 204, and it should be appreciated that the component device 224 is illustrated as a separate component for illustrative purposes only. The component device 224 may include one or more sensors, such as cameras, proximity sensors, light sensors, ambient noise sensors, or the like, in order to provide information for adjusting the one or more settings described above. For example, the component device 224 may be a camera, which may be embedded within the user device 202 or may be a separate component, such as a security camera or personal home device with a built-in camera, which may be used to determine a number of people within a room interacting with the user device 202 and/or to determine features of the room containing the user device 202, such as a distance between the users and the user device 202. Additionally, the component device 224 may be a different user device 304, such as a smartphone, which may communicate with the other user device 304 through a near-field communication protocol, thereby providing a relative position of the devices to one another. Furthermore, in various embodiments, the position of the component device 308 may be triangulated based on its connectivity with the user device 304. Furthermore, in various embodiments, the component device 224 may include a proximity sensor, such as a smart home thermostat or smoke detector, that tracks movement of users between spaces, which may be used to determine a number of people in a room interacting with the user device 202.

Figure 3:
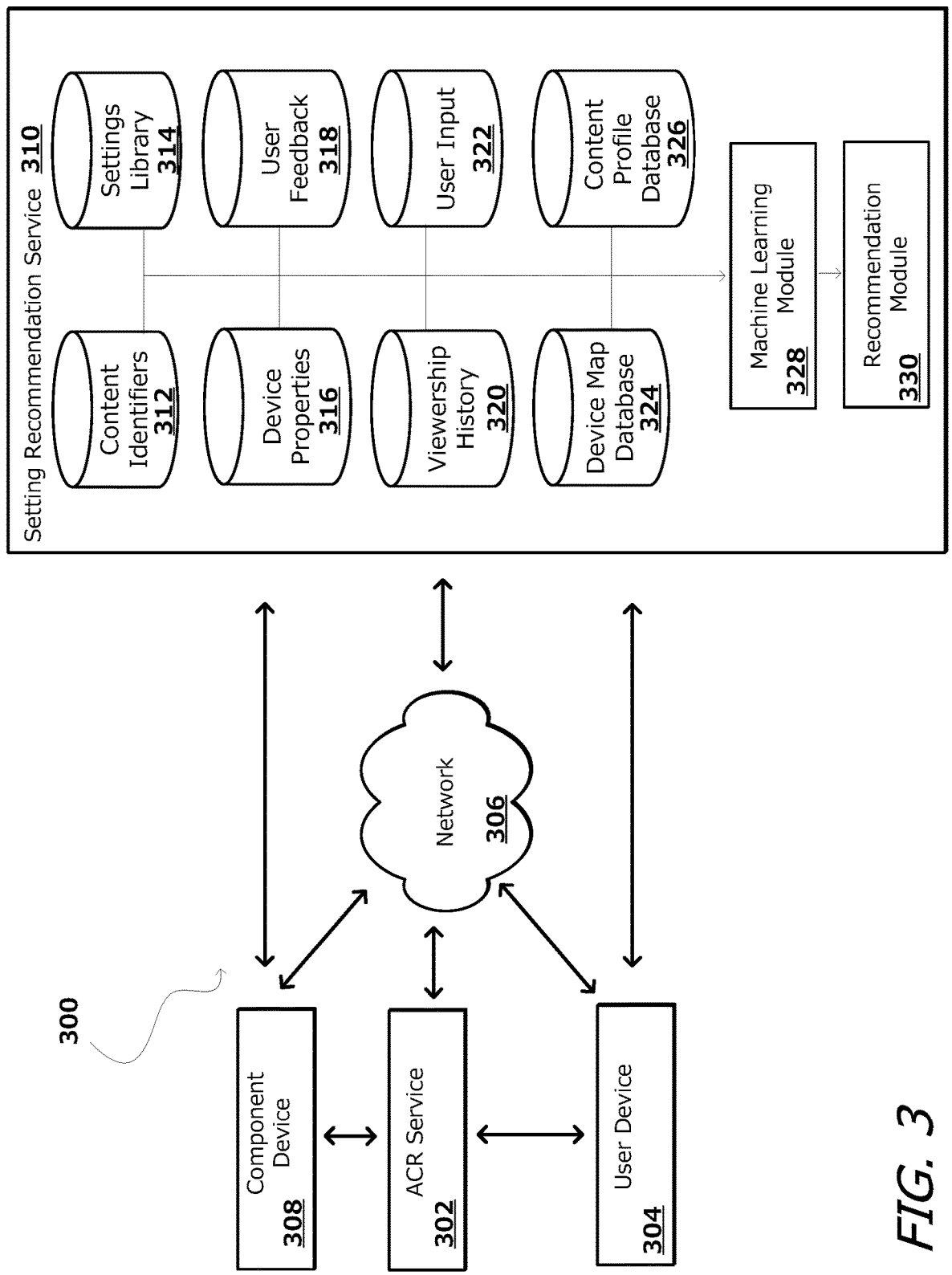
FIG. 3 illustrates an example system for identifying a content type and providing recommended playback settings in accordance with various embodiments.

FIG. 3 illustrates an example system 300 for determining playback settings for a variety of content types. As described above, in various embodiments an ACR service 302 is associated with a user device 304. The ACR service 302 may be integrated into the user device 304, may be in communication with the user device 304, or may be otherwise associated with the user device 304, in various embodiments. In operation, as the user device 304 renders content, the ACR service 302 may extract one or more features from the rendered content for evaluation and identification. For example, the ACR service 302 may extract a screen shot from a video image, identify one or more features from the screen shot, such as an actor or a word associated with the content, and then process the information in order to identify the content utilized by the user device 304. In various embodiments, the ACR service 302 may identify the specific content (e.g., name of a show or movie) or it may identify a content category for the content (e.g., sports, movies, video games, etc.). As described above, the ACR service 302 may generate a fingerprint in order to facilitate identification and recognition of the content. In the illustrated embodiment, the ACR service 302 is communicatively coupled to a network 306, which may be an Internet network as described above.

In the illustrated embodiment, a component device 308, which may be embedded within the user device 304 or be a separate device, may also provide information for use with the ACR service 302 and/or to the network 306 for later use during analysis. For example, as described above, the component device 308 may provide information such as the number of users within the room using or interacting with the user device 304. Additionally, the component device 308 may include a light sensor or ambient noise sensor to facilitate adjustment of the one or more settings. Furthermore, the component device 308 may also provide information related to the configuration of the room containing the user device 304. For instance, in various embodiments, the component device 308 may include a camera with processing capability to detect certain objects in the room, such as a couch, that may be used to determine information related to a likely position of the user relative to the user device 304 during operation. This information may be directed toward the ACR Service 302 and/or to the network 306, as described above.

In various embodiments, a setting recommendation service 310 receives information from the ACR service 302, for example information associated with the identified content. In various embodiments, the setting recommendation service 310 may also receive information directly from the user device 304 and/or the component device 308. The setting recommendation service 310 may be utilized to categorize the content to enable predicting and recommending appropriate device settings for displaying the content. For example, the setting recommendation service 310 may include a content identifier database 312. The content identifier database 312 may include information to categorize content, such as tags associated with a content genre (e.g., drama, action, horror, etc.), a content type (e.g., sports, movie, video game, etc.), a content source (e.g., live, streamed, etc.), or the like. It should be appreciated that content may be associated with multiple tags or identifiers. For example, a professional sporting match be associated as life sports and also live music in the event a performer performs during halftime. Additionally, movies or television shows may fall into a variety of categories, such as a classic drama western. The "classic" tag may be associated with the year of the production. The "drama" tag may be associated with the content or tone of the movie. The "western" tag may be associated with the drama. Each of these tags may be associated with one or more settings for optimal viewing. For example, classic westerns may be filmed with a certain filter to set an ambiance or mood within the film. This knowledge may be utilized to adjust one or more settings of the user device to provide an improved viewing experience.

The illustrated embodiment further includes a settings library 314. The settings library 314 may be associated with different types of settings that are adjustable. By way of example, the settings library 314 may include visual settings (e.g., hue, saturation, brightness, contrast, backlight, color, tint, sharpness, refresh rate, aspect ratio, temperature, white balance, gamma, or a combination thereof), auditory settings (e.g., volume, surround, balance, or a combination thereof), or the like. The settings library 314 may be at least partially dependent on the device properties database 316. This database may store information related to the one or more user devices in operation by the user. For example, the device properties database 314 may include information about a television that is rendering the content and a surround sound system that transmits the audio from the content. The device properties may be limited. For example, certain devices may not have an adjustable white balance setting. Accordingly, these settings may not be considered when evaluating the playback properties, thereby conserving computing resources. Additionally, the device properties database 314 may include the current settings of the user device. As a result, in various embodiments, the setting recommendation service 310 may seek to minimize the number of settings that are adjusted, thereby reducing the likelihood the user will perceive a drastic change in settings. For example, a brightness may be adjusted to a greater degree rather than adjusting both brightness and a contrast. Furthermore, the device properties database 316 may receive or contain additional information from various sensors associated with the user device 304 and/or the component device 308. For example, the user device 304 may include an ambient light sensor. As a result, the brightness or backlighting of the user device 304 may be adjusted to account for the ambient light. In this manner, the playback settings may be different based on a variety of factors, such as time of day, ambient lighting, background noise, and the like.

In various embodiments, the setting recommendation service 310 also includes a user feedback database 318. The user feedback database 318 may contain feedback from the user, feedback from a variety of users, or a combination thereof. For example, the setting recommendation service 310 may request feedback from users after settings are adjusted and compile the feedback to improve recommended playback settings. In various embodiments, a threshold number of users requesting one or more different settings may influence the model to the extent that different settings are recommended. Additionally, for individual user settings, the feedback may be used to further refine settings that the user finds desirable. Accordingly, the system may be tuned to specific user preference for different types of content, thereby enhancing the user experience.

In various embodiments, the settings recommendation service 310 also includes a viewership history database 320. The viewership history database 320 may include a log or history of content utilized by different users of the user device 304, which may be tracked based on user log-ins or detection of one or more user devices associated with particular users. In various embodiments, the viewership history may be used to adjust the one or more playback settings. For example, a particular user may enjoy very loud or vibrant types of programming, and as a result, it may be determined that such playback settings may also be enjoyable to the user when viewing other types of content. By way of example, a user that has a history of watching action moves with large amounts of contrast and loud noises may enjoy a similar viewing experience when watching a professional sporting event, such as a mixed martial arts fight. Accordingly, viewership history may be incorporated into determining playback settings for other types of content to provide an enhanced user experience. The preferred playback settings may be stored for a particular user, for example, in a setting profile associated with the user. As will be appreciated, the user interacting with the content may be determined by user log-in credentials, profiles associated with services within the user device (e.g., streaming services), or the device map described below.

In various embodiments, the settings recommendation service 310 further includes a user input database 322. For example, in various embodiments, the user may be prompted to provide information about the configuration of the room containing the user device 304, such as the size of the room, location of the windows, location of light fixtures, and the like. This information may then be processed to adjust the playback settings. For example, a user device 304 located in a room with a large quantity of natural light may be adjusted differently than a user device 304 in a room without any natural light. Furthermore, playback settings may be adjusted based on a distance between the user device 304 and the expected location of users interacting with the user device. As described above, in various embodiments the component device 308 may determine or more of the pieces of information that the user may input without interaction from the user.

As described above, in various embodiments one or more user devices 304 and/or component devices 308 may be associated with a device map and/or the illustrated device map database 324. In various embodiments, the user device 304 may be a television set. The user device 304 may be relatively stationary at a predetermined location, such as a user's home. However, other devices may move freely into and out of the home and around the user device 304. The device map may be used to determine a location of the other devices relative to the television set based on a number of factors, such as IP address, device IDs, cookies, NFC protocols, and the like. As a result, the device map may track relative locations of the other devices within the home, which may enable the determination of a number of users within a room interacting with the television set based at least in part on the device map database 324. In various embodiments, the device map database 324 may also determine information related to other devices not associated with the user, for example friends of the user, based on access to other device maps via the device map database 324. It should be appreciated that the device map database 324 may be associated with one or more machine learning modules, which may be the same machine learning modules discussed herein, to initiate rules or other evaluation to determine whether a user device is properly associated with a particular device map and user. As such, user devices associated with other households may be recognized, at least in part, to determine proximity and determination of a number of users within a room interacting with the television set. As described above, this may enable one or more modifications of the sets to enhance the user experience.

In various embodiments, a content profile database 326 may be incorporated within the setting recommendation service 310. The content profile database 326 may include one or more settings corresponding to identified content. For example, the content profile database 326 may include a content profile associated to "drama" or "live sports", as described above, that may be stored onto the user device 304 for rapid implementation. As a result, the server described above may be used to identify the content on the user device 304, and then the user device 304 may receive the identification from the server. Thereafter, the user device 304 may access the stored content profiles or the content profile database 326 to implement adjustments to one or more settings of the user device 304. Accordingly, it should be appreciated that the content profile database 326 may be stored on a server and transferred to the user device 304 or may be stored on the user device 304. Furthermore, in various embodiments, the content profile database 326 may be updated as new information is received, for example, as viewing history of various users provides information for adjustments.

The illustrated embodiment includes a machine learning module 328, which may be a neural network as described in detail above. The machine learning module 328 may receive information from one or more of the databases described herein in order to adjust recommended playback settings. For example, the machine learning module 328 may adjust recommended settings based on user feedback or the content identifiers. That is, the machine learning module 328 may discern from the user feedback that the user prefers a darker screen when viewing certain types of movies or playing video games, and as a result, can adjust recommended settings based on these preferences. Furthermore, the machine learning module can be utilized to recommended settings for content that the user does not normally view, which may be based at least in part on how other users have viewed the content. For example, if the user does not normally watch sports but suddenly tunes into a football game, the machine learning module 326 may determine one or more adjustments to the settings to enhance the experience for the user.

In various embodiments, a recommendation module 330 may receive information from the machine learning module 328, or any of the data bases, and thereafter provide recommended playback settings to the user device 304, which may be transmitted via the network 306 or directly to the user device 304. The recommendation module 330 may recommend adjustments to the visual or auditory components of the content playback. Furthermore, the recommendation module 330 may also transmit instructions for manual adjustment of the various settings.

Figure 4:
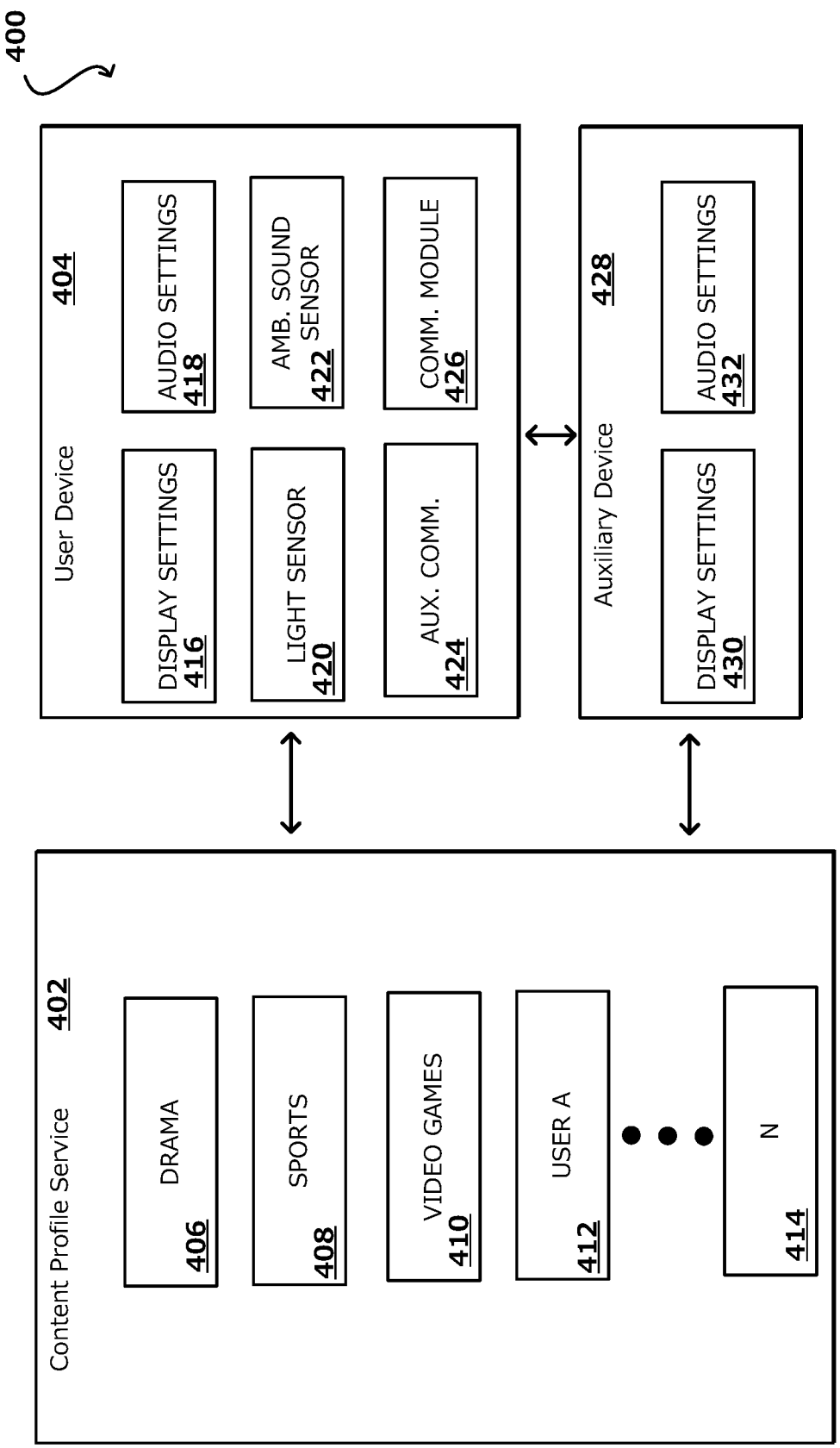
FIG. 4 illustrates an example system for identifying a content type and providing recommended playback settings in accordance with various embodiments.

FIG. 4 is an example of an environment 400 including a content profile service 402 and a user device 404. The content profile service 402 may be integrated into the ACR in various embodiments. As described above, in various embodiments profiles may be generated in order to store and rapidly recall information related to various playback settings. Each profile may include one or more playback settings associated with different types of content. The profiles may also include independently generated user profiles that include various preferred playback settings for the user. In various embodiments, the profiles may be formed at a high level (e.g., movies, television, video games, etc.) or on a more granular level (e.g., dramatic movies, classical movies, television produced before the 1970*s*, etc.). Accordingly, embodiments illustrated herein are for example purpose only and should not be interpreted as limiting the systems and methods disclosed herein.

In the illustrated embodiment, the content profile service 402 includes profiles associated with different types of content. For example, the content profile service 402 includes a profile 406 corresponding to drama, a profile 408 corresponding to sports, a profile 410 corresponding to video game, a profile 412 corresponding to an individual user, and a profile "N" 414 representing the broad range of profiles that may be generated and stored via the content profile service 402. It should be appreciated that each profile may include one or more device settings for playback of various types of media content associated or tagged with the profile. For example, sports and video games may be presented at a higher frame rate in order to prevent blur while dramas may have a higher volume due to an increased amount of dialogue. The content profile service 402 may be continuously updated as new information is presented and, moreover, device settings may switch or adjust throughout use as content changes between profiles. For example, while watching an action movie the content may switch from a high speed car chase to a police interrogation. The system may identify this as a change from action to drama and adjust one or more settings accordingly. In this manner, the profiles may be adjusted, stored, and utilized to rapidly adjust one or more playback settings associated with the user device 404.

The illustrated embodiment further includes the user device 404 and one or more sensors or parameters that may be adjusted based at least in part on an instruction received from the ACR and/or content profile service 402. These sensors may be utilized to provide information to the ACR in order to adjust the one or more playback settings. Furthermore, the settings may receive instructions from the ACR, or from manual inputs from the user, in order to make adjustments to the content playback. The illustrated embodiment includes display settings 416, audio settings 418, a light sensor 420, and an ambient sound sensor 422. As will be understood, the display settings 416 may adjust one or more visual display settings, such as color, hue, saturation, contrast, or the like. The audio settings 418 may adjust volume, balance, or the like. Furthermore, as described above, the light sensor 420 may detect ambient light and relay the information to the ACR. The ACR may then weigh or otherwise change one of the display settings 416 based on the ambient light sensor. For example, if the display is a screen in a bright room the brightness may be turned down in order to better see the screen.

The illustrated user device 404 further includes an auxiliary communication module 424 and a communication module 426. In various embodiments, the auxiliary communication module 424 may be a port or other physical connector, such as a High Definition Media Interface connector, in order to send and receive transmission to/from an auxiliary device 428, such as a surround sound system or set top cable box. The communication module 426 may include a wired or wireless communication protocol, such as an Ethernet port, wireless internet transceiver, Bluetooth™ transceiver, infrared transceiver, or the like.

In the illustrated embodiment, the auxiliary device 428 may send and receive information to/from the user device 404. Further, the auxiliary device 428 may receive instructions from the content profile service 402, which as described above may be part of the ACR. For example, in various embodiments one or more playback settings may be controlled by the auxiliary device 428 rather than by the user device 404. Accordingly, instructions to adjust the one or more settings may be relayed to the auxiliary device 428, which may then material on the user device 404. In the illustrated embodiment, the auxiliary device 428 includes display settings 430 and audio settings 432, which may be adjusted as described above.

Figure 5:
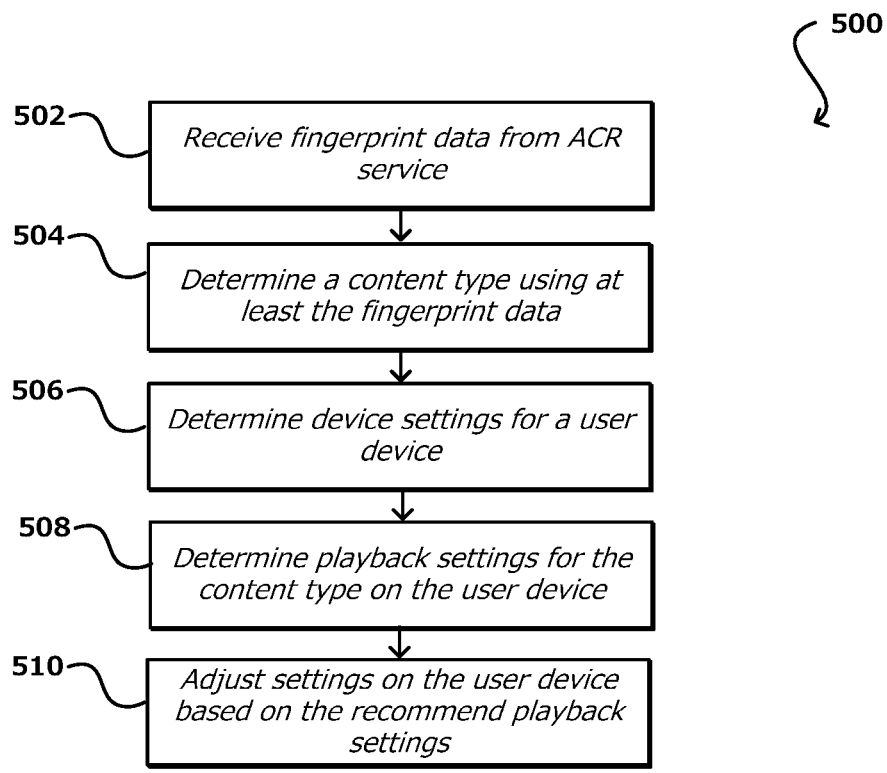
FIG. 5 illustrates an example process for recommending playback settings, in accordance with various embodiments.

FIG. 5 is a flow chart representing a method 500 for adjusting playback settings on a user device. It should be understood that, for any process discussed herein, there can be additional, fewer, or alternative steps performed in similar or alternative orders, or in parallel, within the scope of the various embodiments. The method begins with receiving fingerprint data from an ACR service 502. For example, the ACR service may be integrated into the user device, for example via a chip set or application, that extracts or captures images, videos, or audio rendered on the user device. The ACR service further identifies the specific content according to the fingerprint. For example, the ACR service may use machine learning to apply facial recognition or character recognition to extract identifying information and match the rendered content against a library of information. The method may then determine the content type based at least in part on the fingerprint data 504. For example, once the content is identified it may be evaluated against a library of information to identify a content type, which may include genre, time period of production, type of broadcast (e.g., live, pre-recorded, streaming), image quality, or a combination thereof.

Furthermore, one or more device settings may be determined for the user device 506. For example, playback setting such as display settings (e.g., color, hue, contrast, brightness, etc.), audio settings (e.g., volume, balance, etc.), and the like may be determined. This information may be transmitted via a network in a similar manner as the fingerprint data. In various embodiments, the data may further be determined by evaluating one or more properties of the user device, such as a model number. Information corresponding to the capabilities of the user device may be searched and evaluated based on the model number. For example, if the user device is a television set the model number may determine whether the television is a "Smart TV" or not. Further, the model number may provide information such as resolution capabilities, refresh rate, and the like.

In various embodiments, recommended playback settings are determined based at least in part on the content type and the user device 508. For example, certain content types may be suitable for different settings, such as darker pictures with higher contrast for horror movies or brighter colors for children's movies. As described above, the content types may be categorized broadly (e.g., movie, video game, live sports, etc.) or on a more granular level (e.g., black and white movie from the 1940*s*; first person shooter video game; live football broadcast; etc.). Accordingly, the settings may be determined with particularly based on the content, and as a result, an improved viewing experience may be provided to the user. The recommended playback settings may be stored within a content profile, in various embodiments, which includes playback settings for particular types of identified content. In various embodiments, the settings of the user device are adjusted based on the recommended playback settings 510. For example, color settings on the user device may be automatically adjusted based on the recommended playback settings. In various embodiments, the adjustment is performed automatically. However, in other embodiments, the adjustment may be manually performed by the user based on instructions transmitted to the user. It should be appreciated that the adjustment may be performed in real or near-real time. Further, the adjustment may be gradually implemented so as not to distract or otherwise alert the user to the adjustment. In this manner, playback settings may be adjusted on the user device based on the content type to provide an improved user experience.

Figure 6:
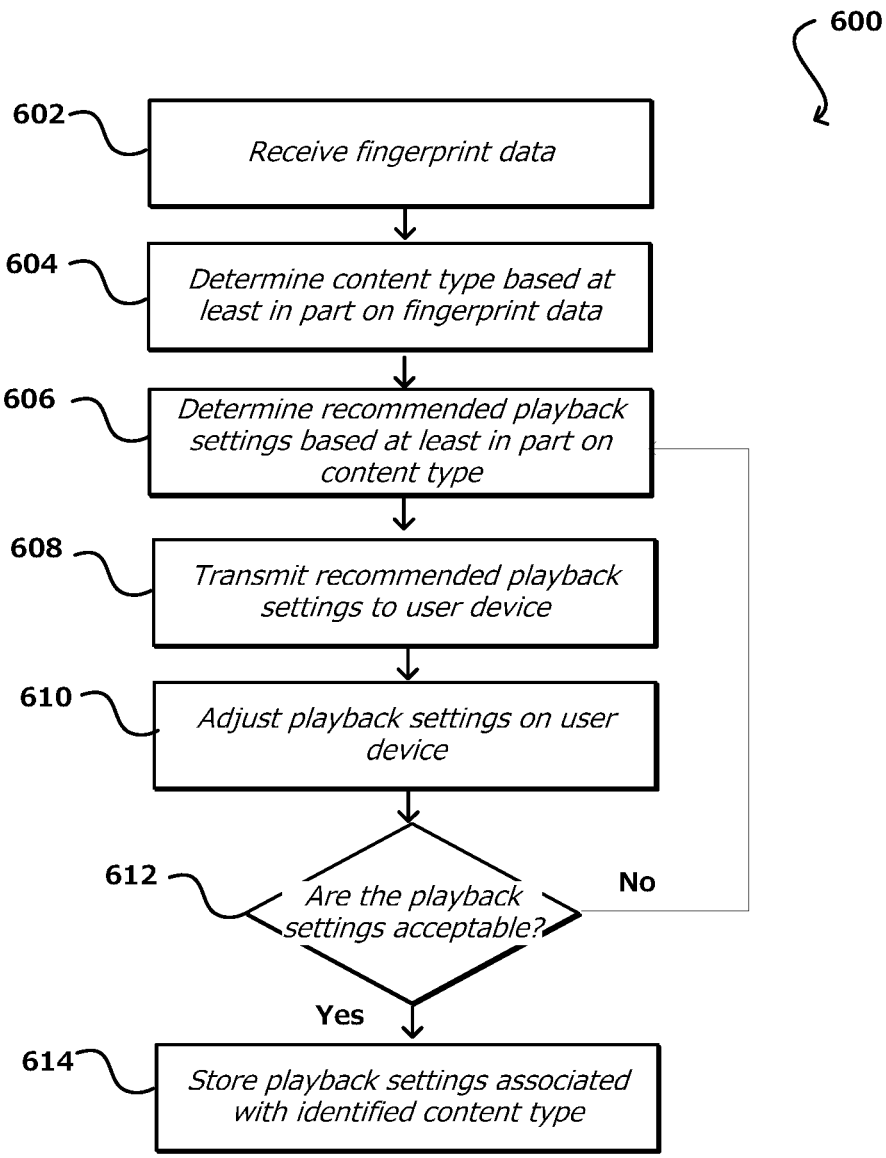
FIG. 6 illustrates an example process for recommending playback settings, in accordance with various embodiments.

FIG. 6 is a flow chart representing a method 600 for adjusting playback settings on a user device. The method beings upon receipt of the fingerprint data 602. This data may be acquired via the ACR service, as described above. In various embodiments, the fingerprint data is received at a remote server that is communicatively coupled to at least one of the user device or the ACR service. The content type is then determined based at least in part on the fingerprint data 604. For example, the fingerprint data may be associated with a particular program. This program may be compared against a library of information that categorizes programs into different content groups, as described above. As a result, recommended playback settings may be determined based on the content type 606. The recommended playback settings may be associated with display settings, audio settings, or any other types of settings associated with rendering or presenting content via a user device. For example, if the user device is a television set playback settings may correspond to certain aspects of the display settings such as color or brightness. Furthermore, the settings may be associated with one or more auxiliary components associated with the user device, such as a surround sound system or a set top cable or streaming box. Furthermore, as described above, the recommended playback settings may be determined, at least in part, via analysis from a variety of sources such as ACR Service 210 and/or the settings recommendation service 310, which may include the viewership history database 320, user input database 322, device map database 324, the content profile database 326, and the like.

In various embodiments, the recommended playback settings are transmitted to the user device 608, for example via a network connection. The transmission of the recommended settings may occur upon detection of the content type or may be transmitted in the form of the content profile database 326, described above, with period updates. For example, in various embodiments, the content profile database 326 may be stored on the user device. As a result, the transmission of the recommended settings may correspond to a transmission of the identified content type, which may enable the user device to access the appropriate stored content profile database. Furthermore, in embodiments, the stored content profile database 326 may be updated periodically, for example via a network connection, as new information is obtained. Thereafter, the playback settings on the user device are adjusted 610. This adjustment may be performed in real or near-real time (e.g., without much delay). Moreover, as described above, the adjustments may be implemented gradually so as to not distract the user while viewing the content on the user device. For example, colors or the like may be adjusted incrementally over a period of time until the recommended playback settings are fully initialized on the user device.

In various embodiments, feedback may be requested from the user regarding the recommended playback settings 612. For example, the user device may prompt the user to answer one or more questions directed to the quality of the viewing experience. In various embodiments, the question may be specifically tailored to the adjustments (e.g., "How was the color?"; "Was the brightness acceptable?", etc.). Additionally, the questions may be more generic regarding the experience as a whole (e.g., "Was the picture quality good?"; "Was the sound good?", etc.). In this manner, the system may obtain information regarding the user's particularized preferences. For example, the user may prefer darker pictures or higher contrasts. By requesting feedback, future adjustments may be tailored to the user's particular tastes. If the user returns feedback that the settings are not acceptable, the method may return to previous steps to determine different playback settings. If the settings are acceptable, the playback settings may be stored 614. For example, the settings may be associated with the content type, with the particular user, or a combination thereof. Accordingly, continuous adjustment of the playback settings may be determined and may further be particularized based on feedback from the user.

Figure 7:
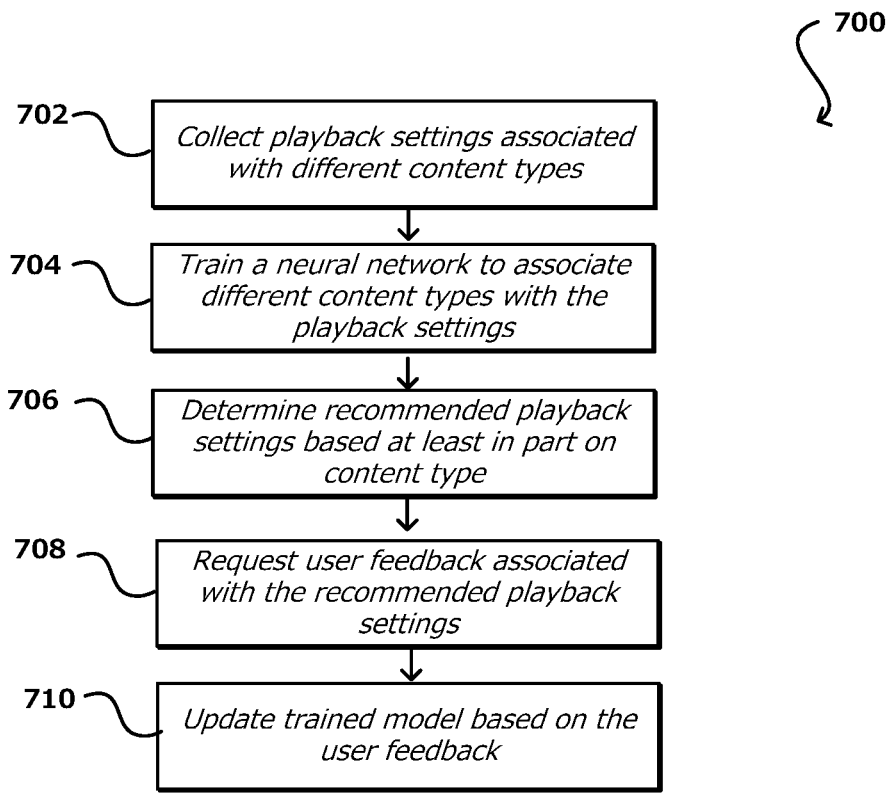
FIG. 7 illustrates an example process for recommending playback settings, in accordance with various embodiments.

FIG. 7 is a flow chart representing a method 700 for training a neural network to determine playback settings based on different content types. The method begins by collecting playback settings associated with different content types 702. For example, the information may be stored within a database or data store that correlates different settings based on content types. In various embodiments, these settings may be crowd sourced, for example, by evaluating the settings users currently use to watch different types of content. Furthermore, the settings may be developed by analyzing one or more properties associated with the different content types. For example, certain type of content may have identifying features, such as bright colors associated with children's movies or shows. Then, a neural network may be trained to associate different playback settings with different content types 704. The training data may be referred to as a "ground truth" to enable the trained model to identify playback settings based on the content type. For example, the model may be trained to recognize content types and then retrieve different potential combinations of playback settings for the content types. Further, the model may incorporate additional information, such as user device settings or features, to enhance the predictions.

In various embodiments, recommended playback settings are determined based at least in part on the content type 706. The recommended settings may be determined by the trained model based on an input into the model, such as inputting the content type and enabling the trained model to determine the recommended playback settings. Furthermore, in various embodiments, the recommended playback settings may be determined by a profile associated with the content type, with the user, or a combination thereof. For example, a user's particularized preferences may be stored within a profile. Additionally, a user's preferred settings for a favorite content type may also be stored and quickly retrievable for use upon identification of the content type. The determined recommended playback settings may be stored within a content profile for particular identified content, as described above.

The method continues by requesting user feedback associated with the playback settings 708. For example, a prompt may appear on the user device or another device to obtain feedback from the user. The feedback may be directed to the display settings, audio settings, or any other feature of the content consumption. The user's responses may be used to update the trained model 710. For example, the trained model may be associated with the particular user, and feedback may enable more personalized playback setting recommendations. Additionally, in various embodiments, feedback from a plurality of users may be utilized to update the trained model. In this manner, continuous improvements to playback settings may be implemented.

Figure 8:
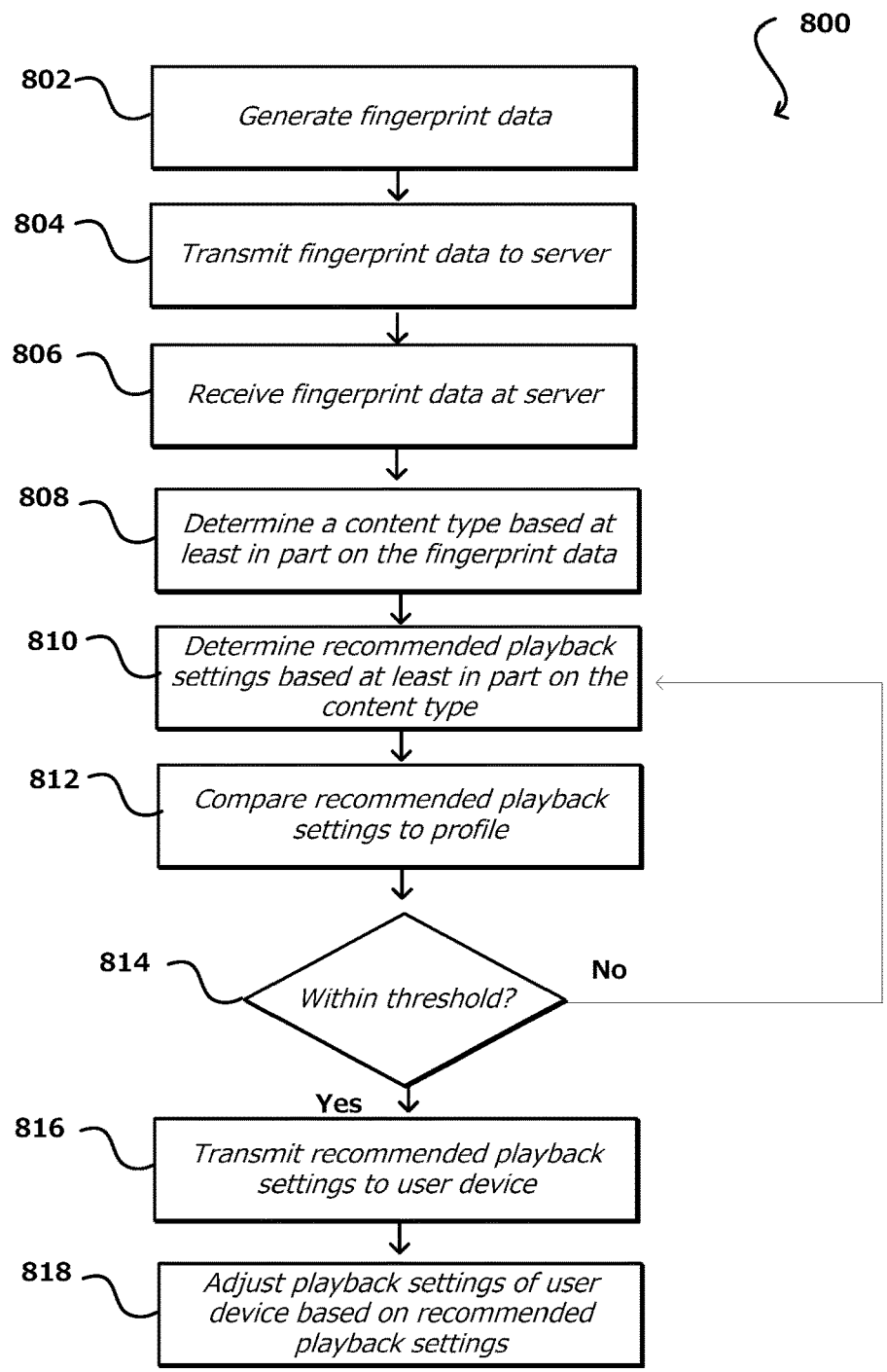
FIG. 8 illustrates an example process for recommending playback settings, in accordance with various embodiments.

FIG. 8 is a flow chart representing a method 800 for generating fingerprint data to obtain recommended playback settings. The method begins by generating fingerprint data 802 to facilitate identification of content. As described above, the ACR service may be utilized to identify content that is rendered on a user device. For example, the ACR service may take a screen shot of video content and thereafter utilize one or more techniques to identify the content based on the screenshot. In various embodiments, the screen shot may include an image of an actor within a show, and thereafter facial recognition may be used to identify the actor and correlate the potential content associated with the actor. Further, in various embodiments, the screen shot may include text identifying the content and character recognition may be utilized to extract and determine the content. This fingerprint data may be transmitted to a server 804. In various embodiments, the user device includes a communication module that facilitates external communication, for example via an Internet network. The server receives the fingerprint data 806 and utilizes the fingerprint data to determine the content type associated with the fingerprint data 808. For example, in various embodiments a neural network may be utilized to identify the content type, as described above. Further, in certain embodiments, a database or data store may be incorporated that has predetermined certain content with a content type. For example, a popular show or movie may already be categorized.

In various embodiments, recommended playback settings are determined based at least in part on the content type 810. Different types of content may be better consumed with different playback settings, and these settings may vary between content types. Accordingly, identification of the content type may be used to determine recommended playback settings to enhance the user experience. In various embodiments, a neural network or other machine learning technique may be utilized to provide the recommended playback settings, as described in detail above. For example, a model may be trained based on certain content types and their associated playback settings. Thereafter, when a content type is provided as an input, the trained network may evaluate the content type and provide associated playback settings. As described above, in various embodiments the user device properties may also be utilized when providing the recommended playback settings. For example, each user device may have different capabilities, and providing settings that the user device cannot meet may lead to a negative user experience. Furthermore, other inputs may be provided to the network to provide the recommended playback settings, to train the model, or for additional purposes.

Furthermore, as described above with respect to the setting recommendation service 310, various other information and databases may be used, at least in part, to provide the recommended playback settings. For example, the viewership history database 320 may be used to develop a setting profile for a particular user based on the user's preferences for certain types of content. Furthermore, information from the component device 308 and/or the user device 304 may be used to determine a configuration of a room including the user device 304, determine a number of people within the room interacting with the user device 304, and the like. Accordingly, the information obtained from the component device 308 and/or the user device 304 may be used to provide recommendations for playback settings. Additionally, as described above, in various embodiments the device map database 324 may provide information related to the number of users interacting with the user device 304, as well as the particular users interacting with the user device 304, to provide personalized and improved recommended playback settings. Additionally, the content profile database 326 may also be utilized to determine the recommended playback settings.

In various embodiments, one or more profiles may be generated to correspond to different content types, different users, or the like. The profiles may include recommended playback settings for different content types or for different users or for different scenarios, such as crowded rooms and the like. These profiles may be developed over a period of time the user interacts with more and more content. Further, in various embodiments, the user may establish their own profile. The recommended playback settings may be compared to settings associated with the profiles 812. For example, if the user has a preference to consume content in a certain way, and the recommended settings are different, then applying the recommended settings may frustrate the user. Accordingly, the settings may be compared. In various embodiments, differences between the various settings may be evaluated 814. For example, differences may be quantified, such as via a threshold or percentage, to determine whether the recommended settings are within a specified range of the settings already established in a profile. If the newly recommended settings are outside of the threshold, then different recommended settings may be determined, for example, by adopting the settings in the profile. However, if the settings are within the threshold, those settings may be transmitted back to the user device 816, for example via a network connection. Thereafter, the user device settings may be adjusted based at least in part on the recommended playback settings 818. As described above, the adjustment may be gradual over a period of time, made in real or near real, or may be instructions for the user to manually update the settings. In this manner, one or more playback settings for a user device may be adjusted based on the content type being consumed via the user device.

Figure 9:
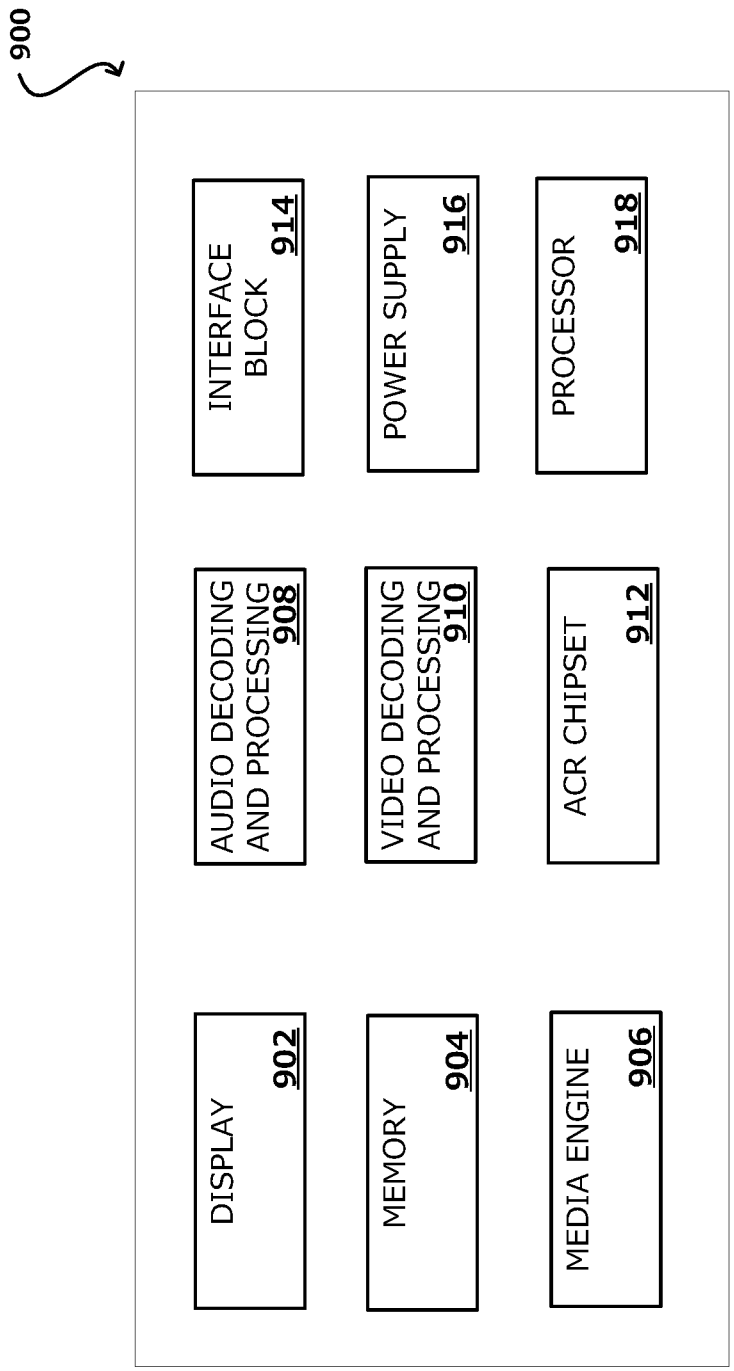
FIG. 9 illustrates an example system for displaying content, in accordance with various embodiments.

FIG. 9 illustrates an example user device 900, which may include display elements (e.g., display screens or projectors) for displaying consumer content. In various embodiments, the user device 900 may be a television, smartphone, computer, or the like as described in detail above. In various embodiments, the illustrated user device 900 includes a display 902. As will be appreciated, the display may enable the viewing of content on the user device 900. The display may be of a variety of types, such as liquid crystal, light emitting diode, plasma, electroluminescent, organic light emitting diode, quantum dot light emitting diodes, electronic paper, active-matrix organic light-emitting diode, and the like. The user device 900 further includes a memory 904. As would be apparent to one of ordinary skill in the art, the device can include many types of memory, data storage or computer-readable media, such as a first data storage for program instructions for execution by the at least one processor.

In various embodiments, the user device 900 includes a media engine 906. As used herein, the media engine 906 may include an integrated chipset or stored code to enable the application of various media via the user device 900. For example, the media engine 906 may include a user interface that the user interacts with when operating the user device 900. Further, the media interface 906 may enable interaction with various programs or applications, which may be stored on the memory 904. For example, the memory 904 may include various third party applications or programs that facilitate content delivery and display via the user device 900.

In various embodiments, the user device 900 further includes an audio decoding and processing module 908. The audio decoding and processing module 908 may further include speakers or other devices to project sound associated with the content displayed via the user device 900. Audio processing may include various processing features to enhance or otherwise adjust the user's auditory experience with the user device 900. For example, the audio processing may include feature such as surround-sound virtualization, bass enhancements, and the like. It should be appreciated that the audio decoding and processing module 908 may include various amplifiers, switches, transistors, and the like in order to control audio output. Users may be able to interact with the audio decoding and processing module 908 to manually make adjustments, such as increasing volume.

The illustrated embodiment further includes the video decoding and processing module 910. In various embodiments, the video decoding and processing module 910 includes components and algorithms to support multiple ATSC DTV formats, NTSC and PAL decoding, various inputs such as HDMI, composite, and S-Video inputs, and 2D adaptive filtering. Further, high definition and 3D adaptive filtering may also be supported via the video decoding and processing module 910. The video decoding and processing module 910 may include various performance characteristics, such as synchronization, blanking, and hosting of CPU interrupt and programmable logic I/O signals. Furthermore, the video decoding and processing module 910 may support input from a variety of high definition inputs, such as High Definition Media Interface and also receive information from streaming services, which may be distributed via an Internet network.

As described above, the illustrated user device 900 includes the ACR chipset 912, which enables an integrated ACR service to operate within the user device 900. In various embodiments, the ACR chipset 912 enables identification of content displayed on the user device 900 by video, audio, or watermark cues that are matched to a source database for reference and verification. In various embodiments, the ACR chipset 912 may include fingerprinting to facilitate content matching. The illustrated interface block 914 may include a variety of audio and/or video inputs, such as via a High Definition Media Interface, DVI, S-Video, VGA, or the like. Additionally, the interface block 914 may include a wired or wireless Internet receiver. In various embodiments, the user device 900 further includes a power supply 916, which may include a receiver for power from an electrical outlet, a battery pack, various converters, and the like. The user device 900 further includes a processor 918 for executing instructions that can be stored on the memory 904.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   receiving a fingerprint from a client device corresponding to at least a portion of content presented via the client device, the fingerprint being generated at least in part by analyzing the content;
   comparing the fingerprint against data representative of various instances of content to determine a content type for the content;
   determining a content profile associated with the determined content type;
   transmitting an identification of the content profile to the client device;
   determining one or more device settings of the client device, the one or more device settings corresponding to a presentation of the content on the client device and including at least one of hue, saturation, brightness, contrast, backlight, color, tint, sharpness, refresh rate, aspect ratio, temperature, white balance, or gamma;
   determining one or more updated device settings, based at least in part on the content profile, exceed a threshold difference compared to the one or more device settings; and
   causing one of more updated device settings to be applied to the client device, the one or more updated device settings being applied incrementally over a period of time, for presentation of the content in accordance with the content profile.

2. The method of claim 1, further comprising:
   identifying a stored content profile on the client device, the stored content profile associated with rendering a particular content type; and
   updating the stored content profile based on one or more recommended device settings.

3. The method of claim 1, wherein the one or more device settings correspond to one or more visual settings of the rendered content.

4. The method of claim 1, wherein the one or more device settings correspond to one or more auditory settings of the rendered content comprising volume, surround, balance, or a combination thereof.

5. The method of claim 1, wherein the one or more device settings correspond to a second client device communicatively coupled to the client device, the second client device comprising a receiver, a gaming system, a surround sound system, or a combination thereof.

6. The method of claim 1, further comprising:
   accessing a device map database, the device map database including information indicative of a number of user devices different from the client device within a predetermined proximity of the client device; and
   adjusting the one of more device settings based on the number of user devices within the predetermined proximity.

7. A computing device, comprising:
   a presentation component;
   a microprocessor; and
   memory including instructions that, when executed by the microprocessor, cause the computing device to:
     generate a fingerprint associated with at least a portion of the content presented by the computing device, the fingerprint identifying one or more characteristic features of the content;
     transmit the fingerprint for analysis;
     receive data corresponding to at least one of a content type or a recommended device setting determined based at least in part upon the analysis;
     determine one or more device settings, the one or more device settings corresponding to a presentation of the content on the client device and including at least one of hue, saturation, brightness, contrast, backlight, color, tint, sharpness, refresh rate, aspect ratio, temperature, white balance, or gamma;
     determine one or more updated device settings, based at least in part on the content type or the recommended device setting, exceed a threshold difference compared to the one or more device settings; and
     adjust an active device setting based on at least the one or more updated device settings, the one or more updated device settings being applied incrementally over a period of time.

8. The computing device of claim 7, wherein the memory includes instructions that, when executed by the microprocessor, further cause the computing device to:
   receive confirmation from a user of the computing device before adjusting the active device setting.

9. The computing device of claim 7, wherein the memory includes instructions that, when executed by the microprocessor, further cause the computing device to:
   retrieve a stored content type profile, the stored client type profile including at least one device setting; and
   update the at least one device setting of the stored content type profile with the recommended device setting.

10. The computing device of claim 7, wherein the memory includes instructions that, when executed by the microprocessor, further cause the computing device to:
    access a content type database via the server, the content type database storing one or more fingerprints associated with rendered content.

11. The computing device of claim 7, further comprising:
obtain viewership history from a viewership history database, the viewership history database corresponding to a user associated with the content on the computing device; and
determine a setting profile for the user based at least in part on the viewership history, the setting profile corresponding to one or more active device settings of the computing device; and
adjusting the active device setting of the computing device based at least in part on the setting profile for the user.

12. The computing device of claim 7, wherein the memory includes instructions that, when executed by the microprocessor, further cause the computing device to:
obtain the content from one of a stored content cache or a content stream;
identify the content type; and
apply a stored content profile for rendering the content, the stored content profile including at least one computing device setting that influences how the content is presented by the computing device.

13. A method, comprising:
receiving a fingerprint from a client device corresponding to at least a portion of content rendered by the client device;
determining a content type of the rendered content based at least in part on the fingerprint;
evaluating one or more device settings of the client device, the one or more device settings influencing how the rendered content is presented on the client device, the one or more device settings including at least one of hue, saturation, brightness, contrast, backlight, color, tint, sharpness, refresh rate, aspect ratio, temperature, white balance, or gamma;
determining one or more adjustments to the device settings based on the determined content type, the one or more adjustments changing how the rendered content is presented on the client device;
determining the one or more adjustments to the device settings exceed a threshold difference compared to the one or more device settings; and
transmitting the one or more adjustments to the client device for incremental application over a period of time.

14. The method of claim 13, further comprising:
changing the device settings based on the one or more adjustments, the one or more adjustments modifying at least one of the visual or auditory rendering of the content.

15. The method of claim 13, further comprising:
retrieving a stored content type profile associated with the client device, the stored client type profile including at least one client device setting for rendering content having a corresponding content type; and
updating the at least one client device setting of the stored content type profile with the one or more adjustments.

16. The method of claim 13, further comprising:
retrieving a stored content type profile associated with the client device, the stored client type profile including at least one client device setting for rendering content having a corresponding content type; and
activating the stored content type profile based on the determined content type.

17. The method of claim 13, further comprising:
transmitting the determined content type to a machine learning system, the machine learning system configured to evaluate one or more device settings for a respective content type;
evaluating one or more content settings corresponding to rendering a particular content type; and
determining one or more settings consistent across the particular content type.

18. The method of claim 13, further comprising:
activating a second client device associated with the first client device, the second client device rendering at least a portion of the content; and
adjusting one or more second client device settings based on the determined content type.

19. The method of claim 13, further comprising:
receiving a customer user profile associated with a particular content type, the customer user profile comprising user device settings for rendering content; and
modifying the one or more adjustments based on the user device settings when the content type is the particular content type.

20. The method of claim 19, further comprising:
determining a configuration of a room including the client device;
determining one or more adjustments based on the configuration; and
applying the one or more adjustments to the device settings.

* * * * *